US009187018B2

(12) United States Patent
Daley

(10) Patent No.: US 9,187,018 B2
(45) Date of Patent: Nov. 17, 2015

(54) VEHICLE SEAT PROTECTOR

(71) Applicant: BRICA, INC., Charlotte, NC (US)

(72) Inventor: Richard A. Daley, Charlotte, NC (US)

(73) Assignee: MUNCHKIN, INC., Van Nuys, CA (US)

( * ) Notice: Subject to any disclaimer, the term of this patent is extended or adjusted under 35 U.S.C. 154(b) by 0 days.

(21) Appl. No.: 14/495,770

(22) Filed: Sep. 24, 2014

(65) Prior Publication Data

US 2015/0008711 A1 Jan. 8, 2015

Related U.S. Application Data

(63) Continuation of application No. 13/840,716, filed on Mar. 15, 2013, now Pat. No. 8,870,283.

(51) Int. Cl.
*A47C 31/00* (2006.01)
*B60N 2/58* (2006.01)
*B60N 2/60* (2006.01)
*B60N 2/28* (2006.01)

(52) U.S. Cl.
CPC .. *B60N 2/60* (2013.01); *B60N 2/28* (2013.01); *B60N 2/5816* (2013.01); *B60N 2/6018* (2013.01)

(58) Field of Classification Search
CPC .......... B60N 2/5816; B60N 2/60; B60N 2/28; B60N 2/6018
USPC ........... 297/219.1, 223, 224, 225, 226, 228.1, 297/228.11, 228.12, 228.13, 229
See application file for complete search history.

(56) References Cited

U.S. PATENT DOCUMENTS

| 4,383,712 | A | 5/1983 | Kaganas |
| 4,396,227 | A | 8/1983 | Neilson |
| 4,457,032 | A | 7/1984 | Clarke |
| 5,228,745 | A | 7/1993 | Hazel |
| 5,403,066 | A | 4/1995 | Drum |
| 5,809,595 | A | 9/1998 | Stevens et al. |

(Continued)

FOREIGN PATENT DOCUMENTS

| CN | 2146243 | 11/1993 |
| JP | 2002-137662 | 5/2002 |

OTHER PUBLICATIONS

International Search Report and Written Opinion for PCT/US2014/029764 Received Aug. 22, 2014 (9 pages).

(Continued)

*Primary Examiner* — Rodney B White
(74) *Attorney, Agent, or Firm* — Robert Z. Evora, Esq.; Wade C. Yamazaki

(57) ABSTRACT

A vehicle protective seat cover for use under a child safety car seat. The cover includes at least a seat cover bottom panel having upper and lower opposed surfaces. Frictional grip pads are attached to the lower protective panel. In one form. the frictional grip pads include four upper grippers protruding above the upper surface, sized and positioned so that child safety car seats of various sizes overlap all four of the upper grippers at least in part, as well as four lower grippers protruding below the lower surface. In another form, four apertures are formed in the seat cover bottom panel. The apertures are sized and positioned so that child safety car seats of various sizes overlap all four of the apertures at least in part. Correspondingly, four frictional grip pads are configured so as to be retained in respective ones of the apertures.

20 Claims, 7 Drawing Sheets

(56) References Cited

U.S. PATENT DOCUMENTS

| | | |
|---|---|---|
| 5,842,739 A | 12/1998 | Noble |
| 6,014,779 A | 1/2000 | Lindholm |
| 6,276,752 B1 | 8/2001 | Conte |
| 6,338,527 B1 | 1/2002 | Toyota et al. |
| 6,702,379 B2 | 3/2004 | Kain |
| 6,786,546 B2 | 9/2004 | McConnell et al. |
| 6,827,398 B2 | 12/2004 | Nazginov |
| 7,000,984 B1 | 2/2006 | Ward |
| 7,172,246 B1 | 2/2007 | Itakura |
| 7,374,240 B2 | 5/2008 | Gold et al. |
| 7,422,278 B2 | 9/2008 | McConnell et al. |
| 7,481,491 B1 | 1/2009 | Diamantis |
| 7,488,036 B2 | 2/2009 | Tache |
| 7,681,292 B2 | 3/2010 | McConnell et al. |
| 7,819,484 B2 | 10/2010 | Conforti |
| 7,878,588 B2 | 2/2011 | Snedeker |
| 8,042,241 B2 | 10/2011 | McConnell et al. |
| 8,458,873 B2 | 6/2013 | McConnell et al. |
| 8,534,755 B2 | 9/2013 | Nickerson |
| 8,870,283 B2 * | 10/2014 | Daley ................. 297/228.12 |
| 2002/0096919 A1 | 7/2002 | Sparks |
| 2005/0077764 A1 | 4/2005 | Nazginov |
| 2007/0210627 A1 | 9/2007 | McConnell et al. |
| 2011/0204687 A1 | 8/2011 | Bishop |
| 2012/0001464 A1 | 1/2012 | Teoh et al. |
| 2013/0270881 A1 | 10/2013 | Fowler et al. |

OTHER PUBLICATIONS

International Preliminary Report on Patentability and Written Opinion for PCT/US2014/029764 Mailed Sep. 24, 2015 (pp. 1-6).

* cited by examiner

VEHICLE SEAT PROTECTOR

This application claims priority to U.S. patent application Ser. No. 13/840,716, filed Mar. 15, 2013, now U.S. Pat. No. 8,870,283 B2; the contents of which are hereby incorporated by reference herein in their entirety into this disclosure.

BACKGROUND OF THE INVENTION

The invention relates to protective seat covers for vehicle seats for use in combination with a child safety car seat.

SUMMARY OF THE INVENTION

In one aspect, a vehicle protective seat cover for use under a child safety car seat is provided. The cover includes at least a seat cover bottom panel having upper and lower opposed surfaces. Frictional grip pads are attached to the lower protective panel. The frictional grip pads include four upper grippers sized and positioned so that child safety car seats of various sizes overlap all four of the upper grippers at least in part. The upper grippers are configured so as to protrude above the upper surface. The frictional grip pads additionally include four lower grippers configured so as to protrude below the lower surface.

In another aspect, a vehicle protective seat cover for use under a child safety car seat is provided. The cover includes at least a seat cover bottom panel having upper and lower opposed surfaces. The seat cover bottom panel is generally rectangular and has four corners and a center. Four apertures are formed in the seat cover bottom panel, the apertures being sized and positioned so that child safety car seats of various sizes overlap all four of the apertures at least in part. Correspondingly, four frictional grip pads are configured so as to be retained in respective ones of the apertures and sized so as to protrude above the seat cover bottom panel upper surface and below the s seat cover bottom panel lower surface.

DETAILED DESCRIPTION

Figure 1:
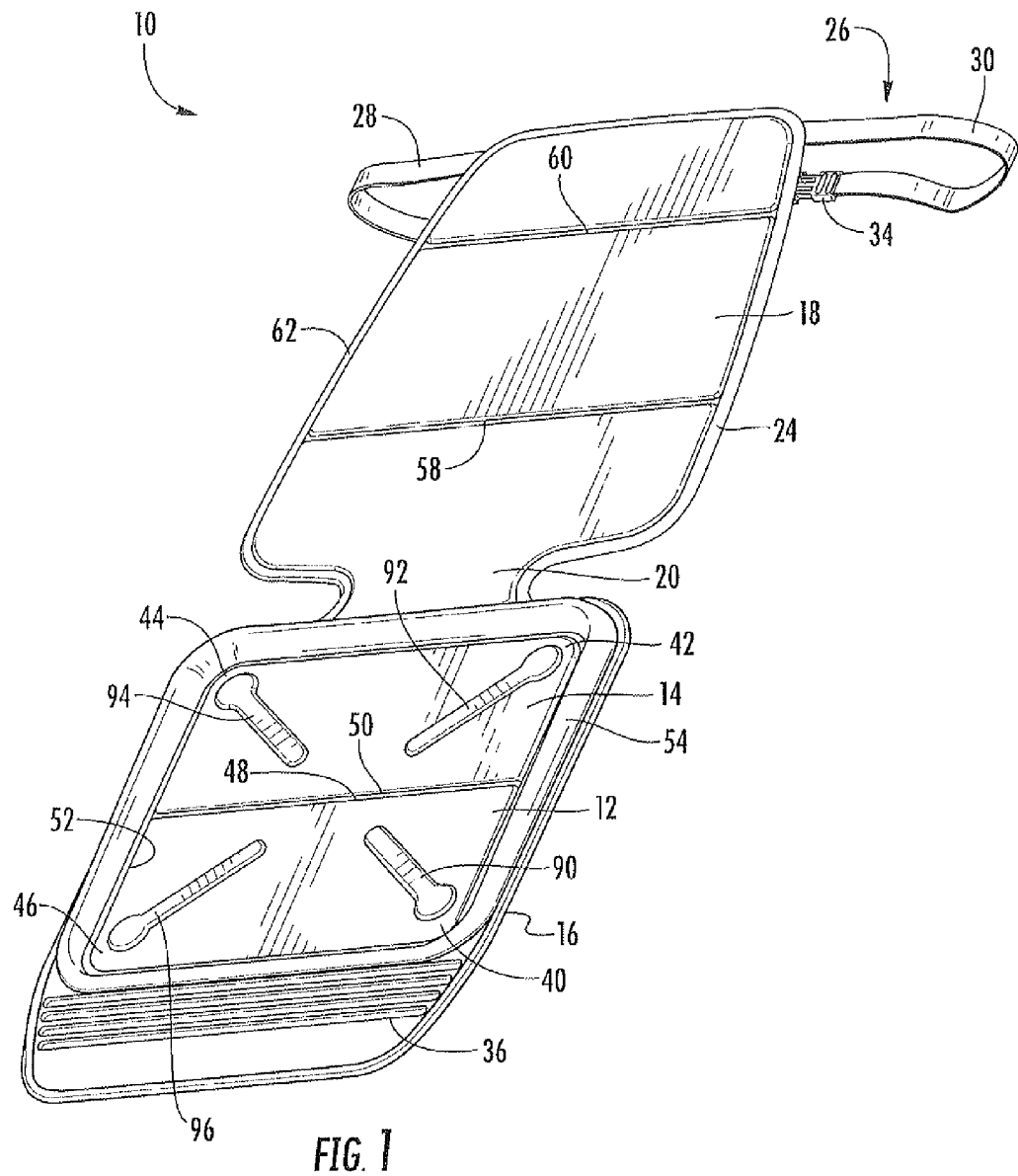
FIG. 1 is a three-dimensional view, generally from the right front, of a first vehicle protective seat cover embodiment of the invention, laid out flat.
Figure 2:
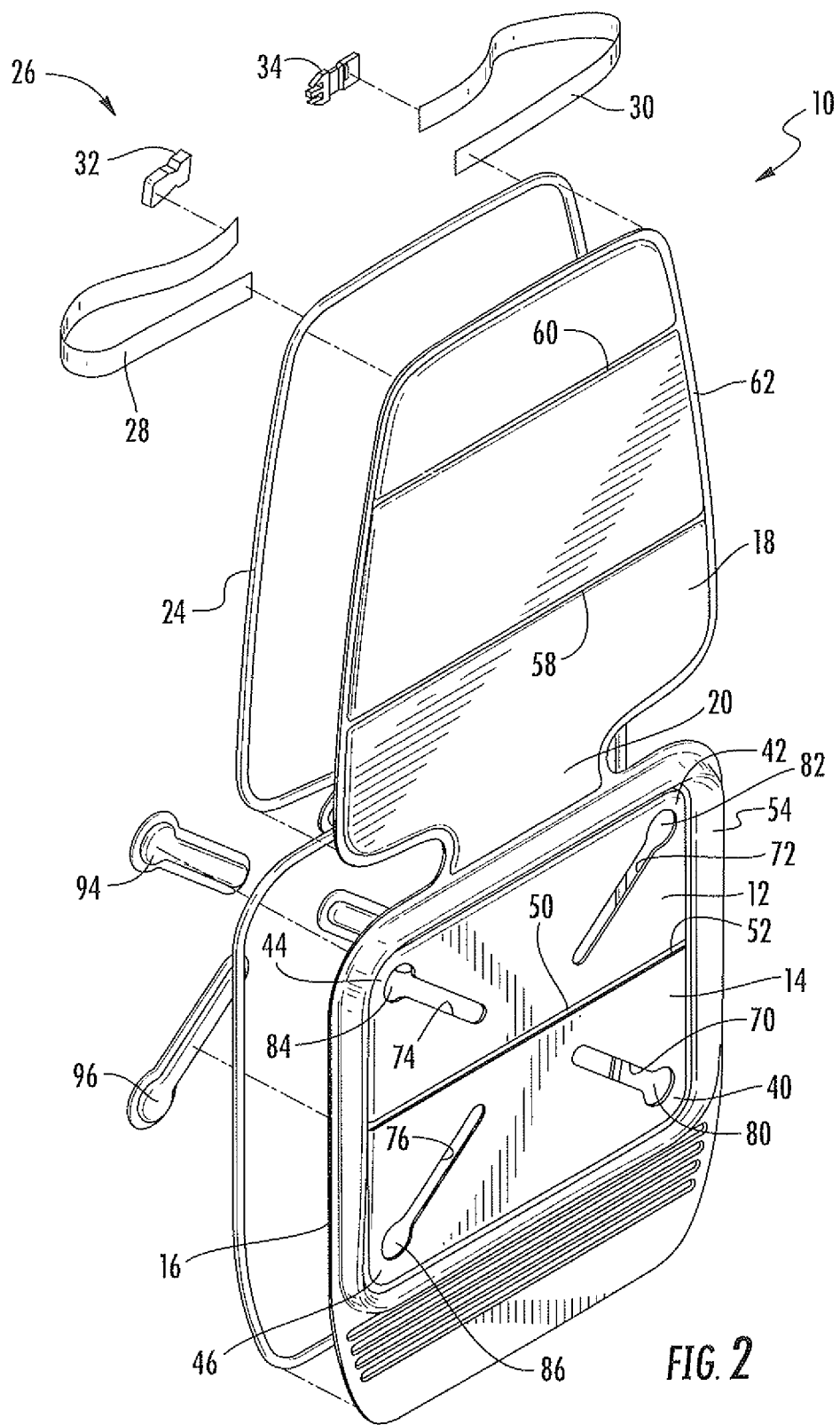
FIG. 2 is an exploded three-dimensional view of the cover of FIG. 1.
Figure 3:
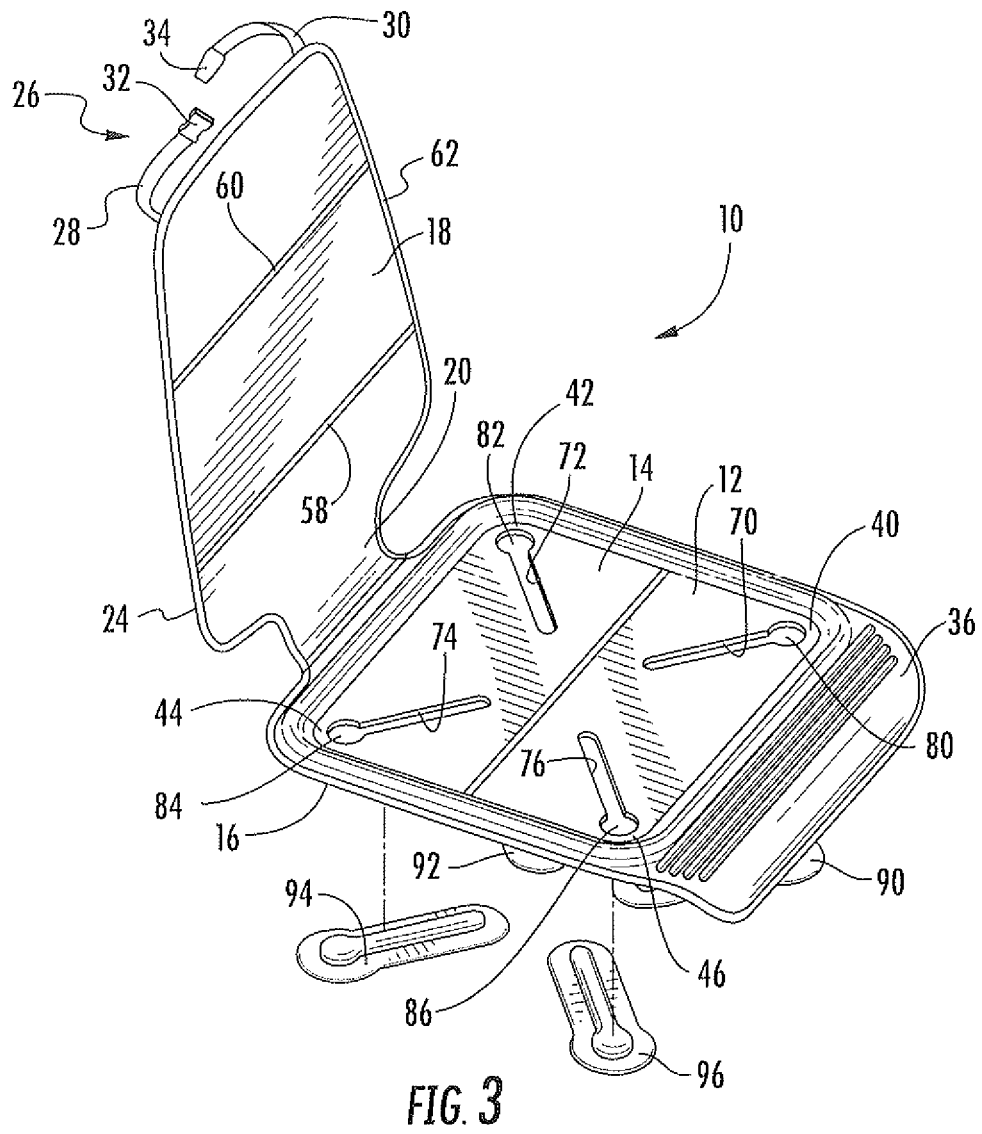
FIG. 3 illustrates the seat cover of FIG. 1 generally in its in-use position, but partly exploded to illustrate frictional grip pads.

Referring first to FIGS. 1-5, a first vehicle protective seat cover 10 embodying the invention includes a seat cover bottom protective panel 12 having upper and lower opposed surfaces 14 and 16, as well as a seat cover back protective panel 18 hingedly attached to the seat bottom protective panel 12 at a narrower flexible portion 20. The back panel 18 can fold down and flat for shipping.

In the embodiment 10 of FIGS. 1-5, the seat cover bottom panel 12 and attached back panel 18, by way of example and not limitation, are thermoformed together as a unitary base 22. An appearance binding 24 surrounds the unitary base 22, conforming to the periphery thereof. The seat cover bottom panel 12, back panel 18 and narrower portion 20 are made of a conventional plastic material, typically thermoformed, of sufficient rigidity to have a defined shape, and yet permit flexing in the narrower portion 20. A protective layer (not shown) is provided on the entire upper surface, particularly to withstand kicks of a child in a rear-facing child safety car seat.

For securing the back panel 18, a headrest strap 26 is provided, including left and right straps 28 and 30 joined by conventional side squeeze clip elements 32 and 34, respectively.

In the seat cover 10 embodiment of FIGS. 1-5, the seat cover bottom panel 12 includes a flexible extending front portion 36 thermoformed as part of the unitary base 22. During use, the front portion 36 extends over the edge of a vehicle seat (not shown), but otherwise the seat cover bottom panel 12 is generally rectangular with four corners 40, 42, 44 and 46, as well as a center 48.

For appearance and stiffening, a channel-like rib 50 extends across the seat cover bottom panel 12, through the center 48 and another peripheral rib structure 52 extends around the seat cover bottom panel 12. To contain spills, crumbs as well as liquids, the seat cover bottom panel 12 additionally has a peripheral raised rim 54.

The back panel 18 similarly has channel-like ribs 58 and 60 extending across, as well as a peripheral rib structure 62.

For enhanced frictional gripping of a child safety car seat (not shown) the vehicle protective seat cover 10 has four apertures 70, 72, 74 and 76 in the seat cover bottom panel 12. The apertures 70, 72, 74 and 76 are located generally near respective corners 40, 42, 44 and 46 but, in any event, are sized and positioned so that child car safety seats of various sizes overlap all four of the apertures 70, 72, 74 and 76 at least in part when a child safety car seat (not shown) is placed in position.

In the seat cover 10 of the first embodiment of FIGS. 1-5, the apertures 70, 72, 74 and 76 are generally slotted in configuration, and each extends from a point near one of the respective corners 40, 42, 44 and 46 towards the center 48. In the illustrated embodiment, the apertures 70, 72, 74 and 76 have a slight "keyhole" configuration, with respective circular portions 80, 82, 84 and 86 near the corners 40, 42, 44 and 46.

Four frictional grip pads 90, 92, 94 and 96 are configured so as to be retained in respective ones of the apertures 70, 72, 74 and 76. The individual grip pads 90, 92, 94 and 96 are sized so as to protrude slightly above the bottom panel 12 upper surface 14 and below the bottom panel 12 lower surface 16 so that, during use, an upper part of each frictional grip pad 90, 92, 94 and 96 contacts the child safety car seat, and a lower part of each frictional grip pad 90, 92, 94 and 96 contacts the vehicle seat. The frictional grip pads 90, 92, 94 and 96 are resilient, and also provide frictional engagement with both the child safety car seat above and the vehicle seat below. Suitable materials for the frictional grip pads 90, 92, 94 and 96 are silicone rubber, and similar materials such as thermoplastic elastomer (TPE), also known as thermoplastic rubber (TPR).

During use, the weight of a child safety car seat is not distributed evenly but, rather, is concentrated on the frictional grip pads 90, 92, 94 and 96 protruding above the upper surface 14 and below the lower surface 16.

Figure 4:
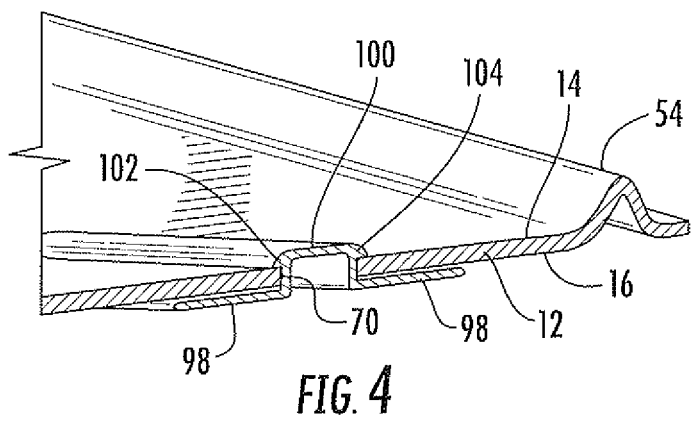
FIG. 4 is a cross-sectional view illustrating the manner in which the frictional grip pads are retained within apertures in the lower protective panel of the seat cover of FIG. 1.
Figure 5:
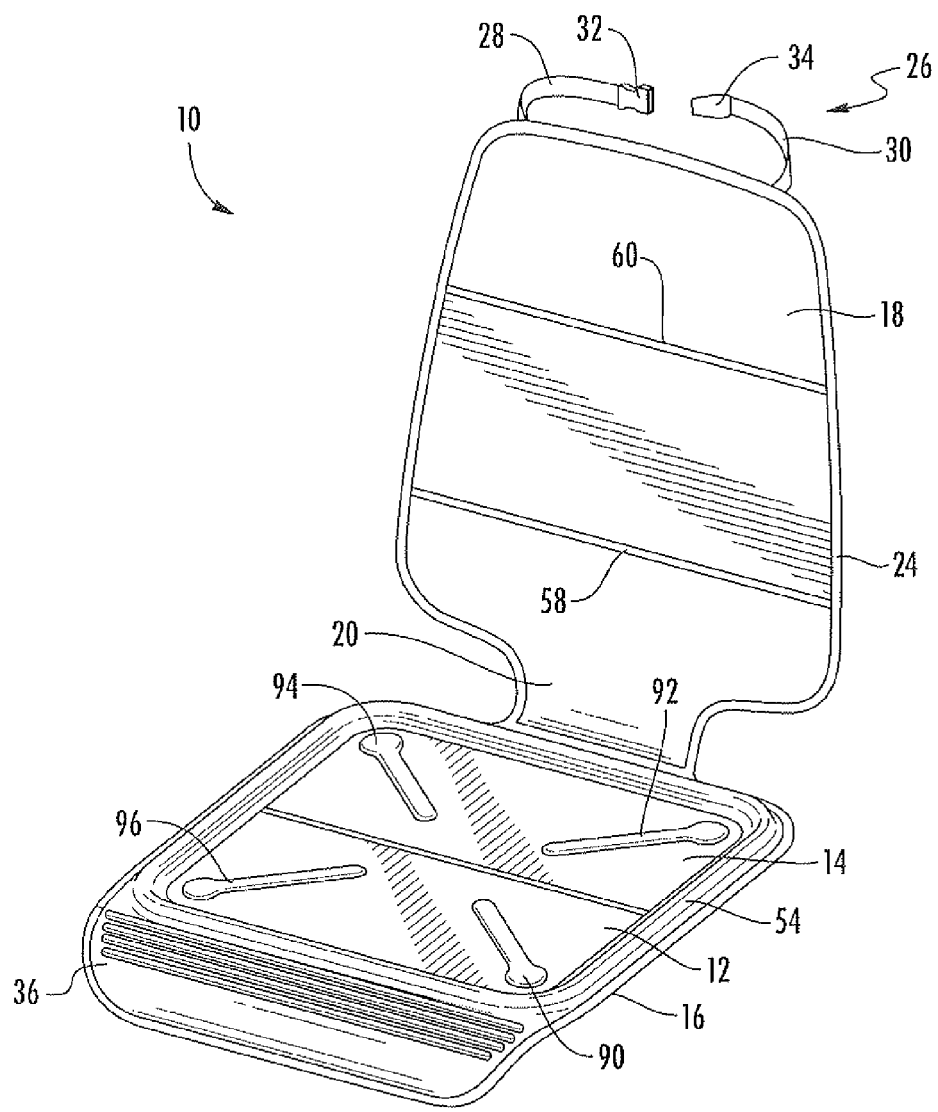
FIG. 5 is an in-use and assembled view of the seat cover of FIG. 1, and alternatively illustrates frictional grip pads attached top and bottom to the seat cover bottom panel.

FIG. 4 in particular illustrates the manner in which the frictional pads 90, 92, 94 and 96 are retained within the respective apertures 70, 72, 74 and 76. Representative frictional grip pad 90 has a lower extending flange portion 98, which extends below the lower surface 16 of the seat cover bottom panel 12, and an upper extending portion 100 of lesser extent in the illustrated embodiment, which extends above the upper surface 14 of the seat cover bottom panel 12. The upper extending portion 100 has a pair of lips 102 and 104 so that the lips 102 and 104 and the lower extending flange portion 98 engage the seat cover bottom panel 12 upper and lower surfaces 14 and 16 so as to retain the representative frictional grip pad 90 in place. A liquid-tight seal is provided, but the representative frictional grip pad 90 can be inserted into and removed from the representative slotted aperture 70 due to resiliency of the grip pad 90.

As an alternative to the apertures 70, 72, 74 and 76, with the frictional pads 90, 92, 94 and 96 retained within the respective apertures 70, 72, 74 and 76, the base 22, and the seat cover bottom panel 12 in particular, can take the form of a fabric or other body with sewn on or over molded grippers on the seat cover bottom panel 12 (top and bottom), and no apertures. Thus, FIG. 5 alternatively may be viewed as illustrating frictional grip pads in general attached to the seat cover bottom panel 12. In the more specific alternative embodiment described in this paragraph, the generalized frictional grip pads include four upper grippers (visible upper grippers 90, 92, 94 and 96 in FIG. 5) sized and positioned so that child safety car seats of various sizes overlap all four of the upper grippers 90, 92, 94 and 96 at least in part. The upper grippers 90, 92, 94 and 96 are configured so as to protrude above the upper surface 14. The generalized frictional grip pads additionally include four lower grippers configured so as to protrude below the lower surface 16. The lower grippers are not visible in the orientation of FIG. 5, being hidden on the underside, but have the same appearance as the upper grippers 90, 92, 94 and 96. Thus it will be appreciated that the frictional grip pads may be all one piece as is illustrated in FIG. 4, or the frictional grip pads may each have separate upper and lower grippers. Again, during use, the weight of a child safety car seat is not distributed evenly but, rather, is concentrated on the grip pads protruding above the upper surface 14 and below the lower surface 16.

Figure 6:
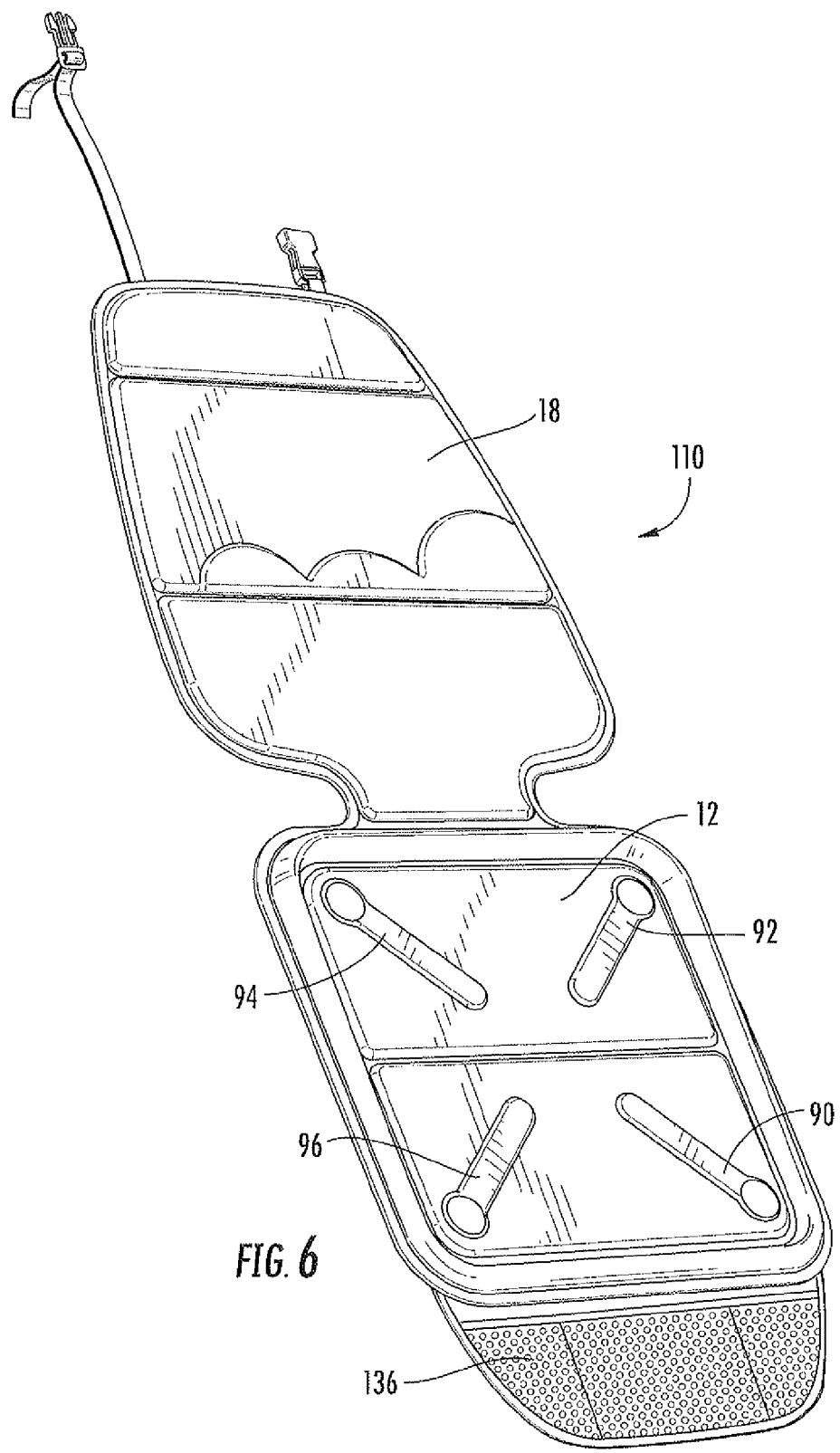
FIG. 6 is a three-dimensional view, generally from the left front, of a second vehicle protective seat cover embodying the invention.

FIG. 6 illustrates another seat cover 110 embodying the invention, differing from the seat cover 10 of FIGS. 1-5 in that, rather than having an extending front portion 36 (molded as part of the unitary base 22), the seat cover 110 includes a front portion 136 of fabric netting, which may include pockets.

Figure 7:
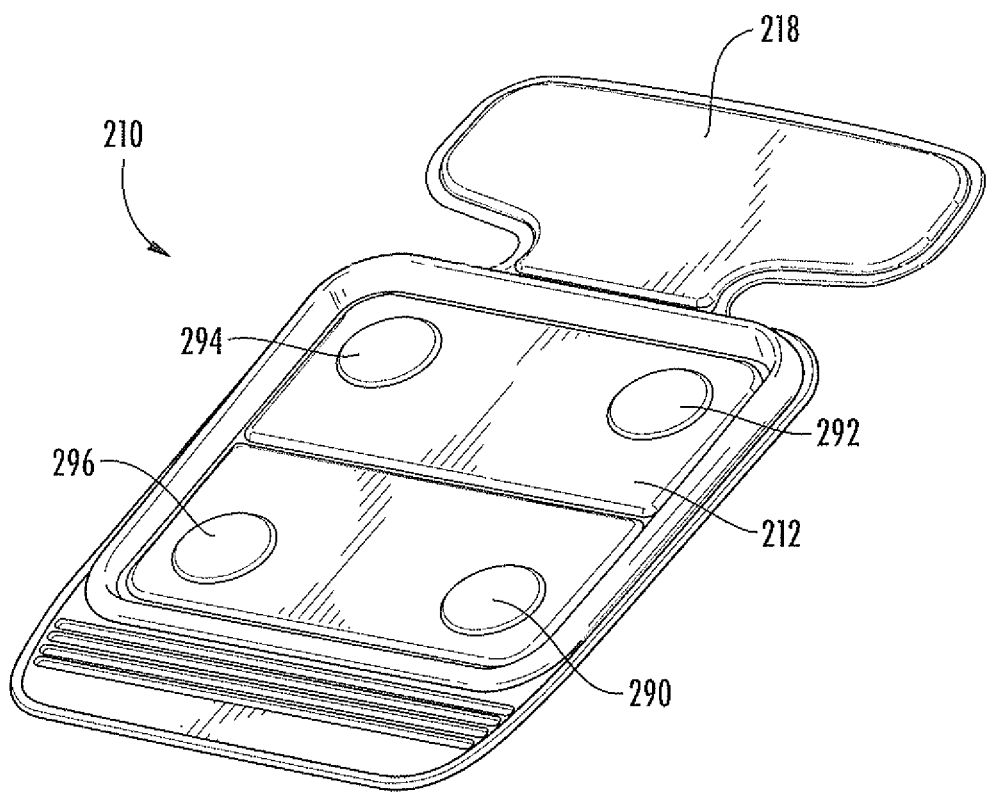
FIG. 7 is a three-dimensional view, in the same orientation as FIG. 1, of a third vehicle protective seat cover embodying of the invention.
Figure 8:
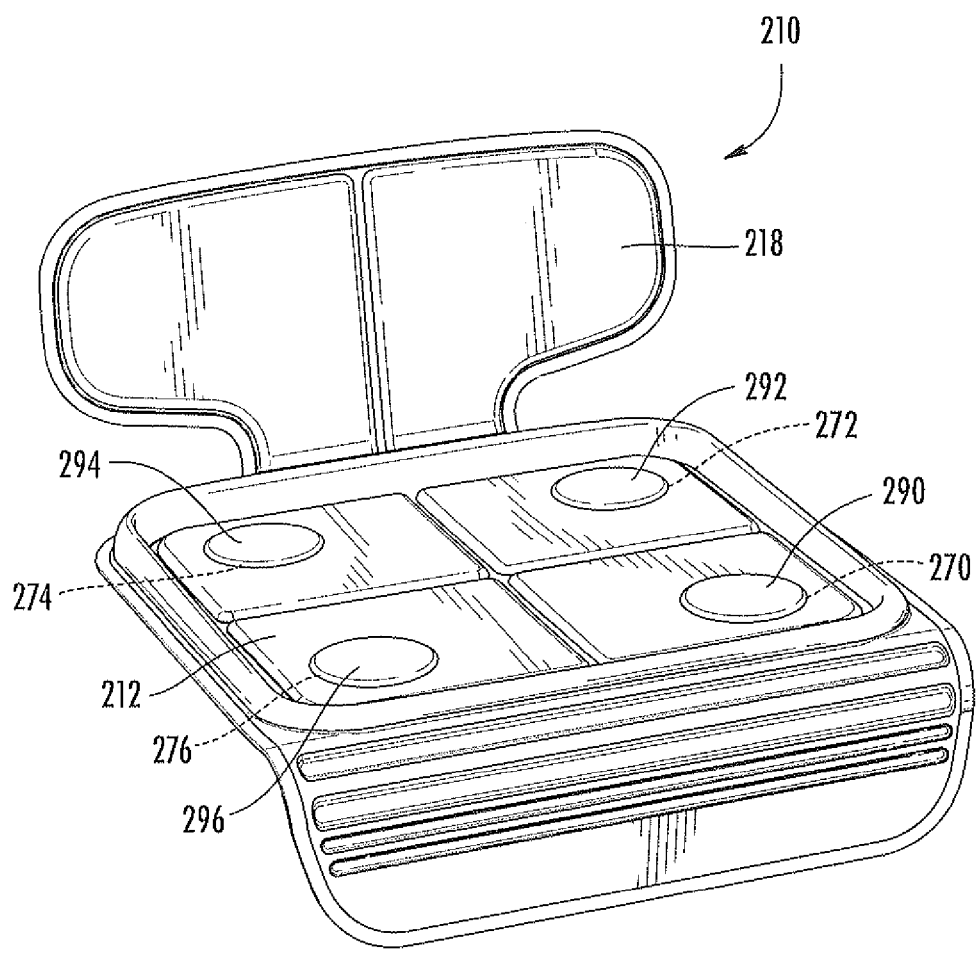
FIG. 8 illustrates the protective seat cover of FIG. 7 in an in-use configuration.

Finally, FIGS. 7 and 8 illustrate a third seat cover 210 embodying the invention. The seat cover 210 differs from the seat cover 10 in that the back panel 218 is of lesser vertical extent, and apertures 270, 272, 274 and 276 are circular rather than slotted. Nevertheless, the apertures 270 in the seat bottom 212 are sized and positioned so that child safety car seats of various sizes overlap all four of the apertures 270, 272, 274 and 276 at least in part.

Correspondingly, circular frictional grip pads 290, 292, 294 and 296 are provided and fit into the circular apertures 270, 272, 274 and 276 and function in the same manner as the elongated frictional grip pads 90, 92, 94 and 96 described hereinabove.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A vehicle protective seat cover for use under a child safety car seat, comprising:
    a seat cover bottom panel having a lower surface and at least one aperture; and
    at least one frictional grip pad received and secured by the at least one aperture,
    wherein, the at least one frictional grip pad having a lower flange portion extending below the lower surface of the seat cover bottom panel, the lower flange providing a frictional engagement between the seat cover bottom panel and a vehicle seat.

2. The vehicle protective seat cover as recited in claim 1, further comprising a back protective panel hingedly attached to the seat cover bottom panel.

3. The vehicle protective seat cover as recited in claim 2, wherein the seat cover bottom panel and the back protective panel are thermoformed together as a unitary base having a narrower portion between the seat cover bottom panel and the back protective panel allowing for a hinged connection.

4. The vehicle protective seat cover as recited in claim 3, further comprising a binding surrounding a periphery of the unitary base.

5. The vehicle protective seat cover as recited in claim 2, further comprising a strap attached to an upper portion of the back protective panel.

6. The vehicle protective seat cover as recited in claim 2, wherein at least one of the seat cover bottom panel and the back protective panel has a rib.

7. The vehicle protective seat cover as recited in claim 1, wherein the seat cover bottom panel has a peripheral raised rim.

8. The vehicle protective seat cover as recited in claim 1, wherein the seat cover bottom panel has a flexible extending front portion.

9. The vehicle protective seat cover as recited in claim 1, wherein the at least one frictional grip pad has an upper extending portion which extends above an upper surface of the seat cover bottom panel.

10. The vehicle protective seat cover as recited in claim 9, wherein the upper extending portion has a pair of lips, the pair of lips and the lower flange portion engage the seat cover bottom panel to secure the at least one frictional grip pad.

11. The vehicle protective seat cover as recited in claim 9, wherein the lower flange portion extends substantially parallel to the seat cover bottom panel and provides a frictional engagement between the seat cover bottom panel and a vehicle seat.

12. The vehicle protective seat cover as recited in claim 1, wherein the at least one frictional grip pad is removable from the seat cover bottom panel.

13. A vehicle seat protector, comprising:
    a seat cover bottom panel having a lower surface and at least one aperture; and
    at least one frictional grip pad received and secured by the at least one aperture, the at least one frictional grip pad having a lower flange portion which extends substantially parallel to the seat cover bottom panel, wherein the lower flange provides a frictional engagement between the seat cover bottom panel and a vehicle seat.

14. The vehicle seat protector as recited in claim 13, wherein the at least one frictional grip pad has an upper portion having a pair of lips, the pair of lips and the lower flange portion engaging the seat cover bottom panel to secure the at least one frictional grip pad.

15. The vehicle seat protector as recited in claim 13, further comprising a back protective panel hingedly attached to the seat cover bottom panel.

16. The vehicle seat protector as recited in claim 13, wherein the seat cover bottom panel has a peripheral raised rim.

17. The vehicle seat protector as recited in claim 13, wherein the at least one frictional grip pad is made of elastomer.

18. A protective seat cover for use under a child safety car seat, comprising:
  a seat cover bottom panel having an upper surface, a lower surface and at least one aperture; and
  at least one frictional grip pad having a lower flange portion connected by an intermediate portion to an upper extending portion, the at least one frictional grip pad received and secured by the at least one aperture,
  wherein the lower flange portion extends below the lower surface of the seat cover bottom panel and the upper extending portion which extends above the upper surface of the seat cover bottom panel.

19. The protective seat cover as recited in claim 18, wherein the lower flange portion extends substantially parallel to the seat cover bottom panel, and provides a frictional engagement between the seat cover bottom panel and a vehicle seat.

20. The protective seat cover as recited in claim 18, wherein the upper portion has a pair of lips, the pair of lips and the lower flange portion engaging the seat cover bottom panel to secure the at least one frictional grip pad.

\* \* \* \* \*